US010289616B2

(12) United States Patent
Kruglick

(10) Patent No.: US 10,289,616 B2
(45) Date of Patent: May 14, 2019

(54) VIRTUAL DATACENTER PRIVATE SUBLETS FOR QUARANTINED ACCESS TO DATA

(71) Applicant: EMPIRE TECHNOLOGY DEVELOPMENT LLC, Wilmington, DE (US)

(72) Inventor: Ezekiel Kruglick, Poway, CA (US)

(73) Assignee: Empire Technology Development, LLC, Wilmington, DE (US)

( * ) Notice: Subject to any disclaimer, the term of this patent is extended or adjusted under 35 U.S.C. 154(b) by 771 days.

(21) Appl. No.: 14/873,172

(22) Filed: Oct. 1, 2015

(65) Prior Publication Data

US 2016/0026681 A1    Jan. 28, 2016

Related U.S. Application Data

(63) Continuation of application No. 13/389,380, filed as application No. PCT/US2011/049069 on Aug. 25, 2011, now Pat. No. 9,213,844.

(51) Int. Cl.
   *G06F 15/173*    (2006.01)
   *G06F 16/245*    (2019.01)
   *G06F 16/2458*    (2019.01)
   *G06F 21/60*    (2013.01)

(52) U.S. Cl.
   CPC ........ *G06F 16/245* (2019.01); *G06F 16/2465* (2019.01); *G06F 21/60* (2013.01)

(58) Field of Classification Search
   CPC .................................................... H04L 45/00
   USPC ......................................................... 709/224
   See application file for complete search history.

(56) References Cited

U.S. PATENT DOCUMENTS

| | | |
|---|---|---|
| 2005/0114502 A1 | 5/2005 | Raden et al. |
| 2007/0156656 A1 | 7/2007 | Pather et al. |
| 2008/0155208 A1 | 6/2008 | Hiltgen et al. |
| 2008/0281660 A1 | 11/2008 | Sajja et al. |
| 2008/0319771 A1* | 12/2008 | Shriver-Blake ...... G06Q 10/101 705/300 |
| 2009/0300437 A1 | 12/2009 | Bhame et al. |
| 2010/0077467 A1 | 3/2010 | Satagopan et al. |
| 2010/0306154 A1 | 12/2010 | Poray et al. |
| 2011/0242976 A1 | 10/2011 | Gusat et al. |
| 2012/0167167 A1* | 6/2012 | Kruger .................... G06F 12/00 726/1 |

OTHER PUBLICATIONS

"About Us/News," Winterberry Group Website Static accessed at http://web.archive.org/web/20150418010035/http://winterberrygroup.com/aboutus/news , Mar. 2014, pp. 4.

(Continued)

*Primary Examiner* — Vivek Srivastava
*Assistant Examiner* — Karina J Garcia-Ching
(74) *Attorney, Agent, or Firm* — IP Spring-AI

(57) ABSTRACT

Technologies are generally described for providing a system that allows data use clients direct access to perform complex analysis on data assets without compromising the assets by sharing the data contained may set up the data assets in virtual datacenters (VDCs) within a physical datacenter and open additional resources within the VDCs to data use clients. The data use clients may be enabled to upload and execute analysis applications with access to valuable data. Data traffic exiting the VDCs through such applications however, ma be controlled by a supervisor that analyzes an output and enforces limitations on content and/or volume based on a level of purchased access.

15 Claims, 7 Drawing Sheets

(56) References Cited

OTHER PUBLICATIONS

Brassil, J., "Physical Layer Network Isolation in Multi-tenant Clouds," IEEE 30th international conference on Distributed Computing Systems Workshops (ICDCSW), pp. 75-81, Jun. 21-25, 2010.
Chuanxiong,G., et al., "Second Net: a data center network virtualization architecture with bandwidth guarantees," Proceedings of the 6th International Conference, Co-Next, pp. 1-14, (2010).
International Search Report and Written Opinion PCT/US11/49069 dated Jan. 11, 2012.
Julia A., and Steve S., "Scrapers' Dig Deep for Data on Web," accessed at http://web.archive.org/web/20150718101337/http://www.wsj.com/articles/SB10001424052748703358504575544381288117888, accessed on Sep. 9, 2015, pp. 7.
Kanaracus, C., "Microsoft's Cloud ERP Plans Get Mixed Reactions," accessed at http://web.archive.org/web/20110421030849/http://www.pcworld.com/article/224959/microsofts_cloud_erp_plans_get_mixed_reactions.html, published on Apr. 13, 2011, pp. 1-5.
"Nielsen Buzz Metrics" The Global Measurement Standard in Consumer-Generated Media, accessed at http://web.archive.org/web/20100127095531/http://www.marketingshift.com/companies/marketing/market-research/nielsen-buzzmetrics.cfm accessed on Sep. 9, 2015, pp. 6.
Patrick T., "Congress Urged to Leave the Cloud Alone," accessed at http://www.cio.com/article/2409220/cloud-computing/congress-urged-to-leave-cloud-computing-alone.html , Apr. 12, 2011, pp. 4.
Shieh, A., et al., "SideCar: Building Programmable Datacenter Networks without Programmable Switches," Microsoft Research and Cornell University, pp. 1-6, (2010).

* cited by examiner

VIRTUAL DATACENTER PRIVATE SUBLETS FOR QUARANTINED ACCESS TO DATA

CROSS-REFERENCE TO RELATED APPLICATIONS

This Application is a continuation under 35 U.S.C. § 120 of co-pending U.S. patent application Ser. No. 13/389,380 filed on Feb. 7, 2012, which is the National Stage filing under 35 U.S.C. § 371 of PCT Application Ser. No. PCT/US11/49069 filed on Aug. 25, 2011. The disclosures of the U.S. Patent Application and the PCT Application are hereby incorporated by reference in their entireties.

BACKGROUND

Unless otherwise indicated herein, the materials described in this section are not prior art to the claims in this application and are not admitted to be prior art by inclusion in this section.

With the proliferation of computing and networking technologies, an increasingly large number of business and personal transactions are performed online. Thus, people are providing personal information for a variety of purposes. In addition, indirect information about people and companies such as spending habits, geographic or demographic information, and similar data, collectively referred to as "Marketing Intelligence", is available through various types of online service providers. Databases of collected "Market Intelligence" data have significant value, and firms that collect such databases are in the business of trying to maximize the realized value without losing value by letting others transfer too much data to themselves.

Some companies collect personal information for detailed background reports on individuals, such as email addresses, cell numbers, photographs and posts on social-network sites. Others offer what are known as listening services, which monitor in real time hundreds or thousands of news sources, blogs and websites to see what people are saying about specific products or topics. Many of these firms "scrape" data from search, social networking, and similar websites. To prevent others from using their data or provide customer security, an increasing number of websites arc developing ways to prevent such mass data collection, meaning that such data sets become more valuable as it becomes harder to collect.

SUMMARY

The present disclosure generally describes techniques for allowing clients direct access to perform complex analysis on data assets without compromising those assets by sharing the data contained. According to some examples, a method for controlling analysis of virtual datacenter managed data is provided. The method may include receiving one or more control rules associated with access to managed data, receiving code associated with performing analysis tasks on the managed data from a data use client, enabling the analysis tasks to be performed on the managed data employing the received code, and/or controlling delivery of analysis results to the data use client based on the one or more control rules.

According to other examples, an apparatus for controlling analysis of virtual datacenter managed data may include a memory configured to store instructions, a communication module, and a processing unit configured to execute as data delivery control application in conjunction with the instructions. The data delivery control application may be configured to receive one or more control rules associated with access to managed data, receive code associated with performing analysis tasks on the managed data from a data use client, enable the analysis tasks to be performed on the managed data employing the received code, and/or control delivery of analysis results to the data use client based on the one or more control rules.

According to further examples, a computer-readable storage medium may have instructions stored thereon for controlling analysis of virtual datacenter managed data. The instructions may include receiving one or route control rules associated with access to managed data, receiving code associated with performing analysis tasks on the managed data from a data use client, enabling the analysis tasks to be performed on the managed data employing the received code, and/or controlling delivery of analysis results to the data use client based on the one or more control rules limiting delivered analysis results based on at least one of a content and an amount of the results.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
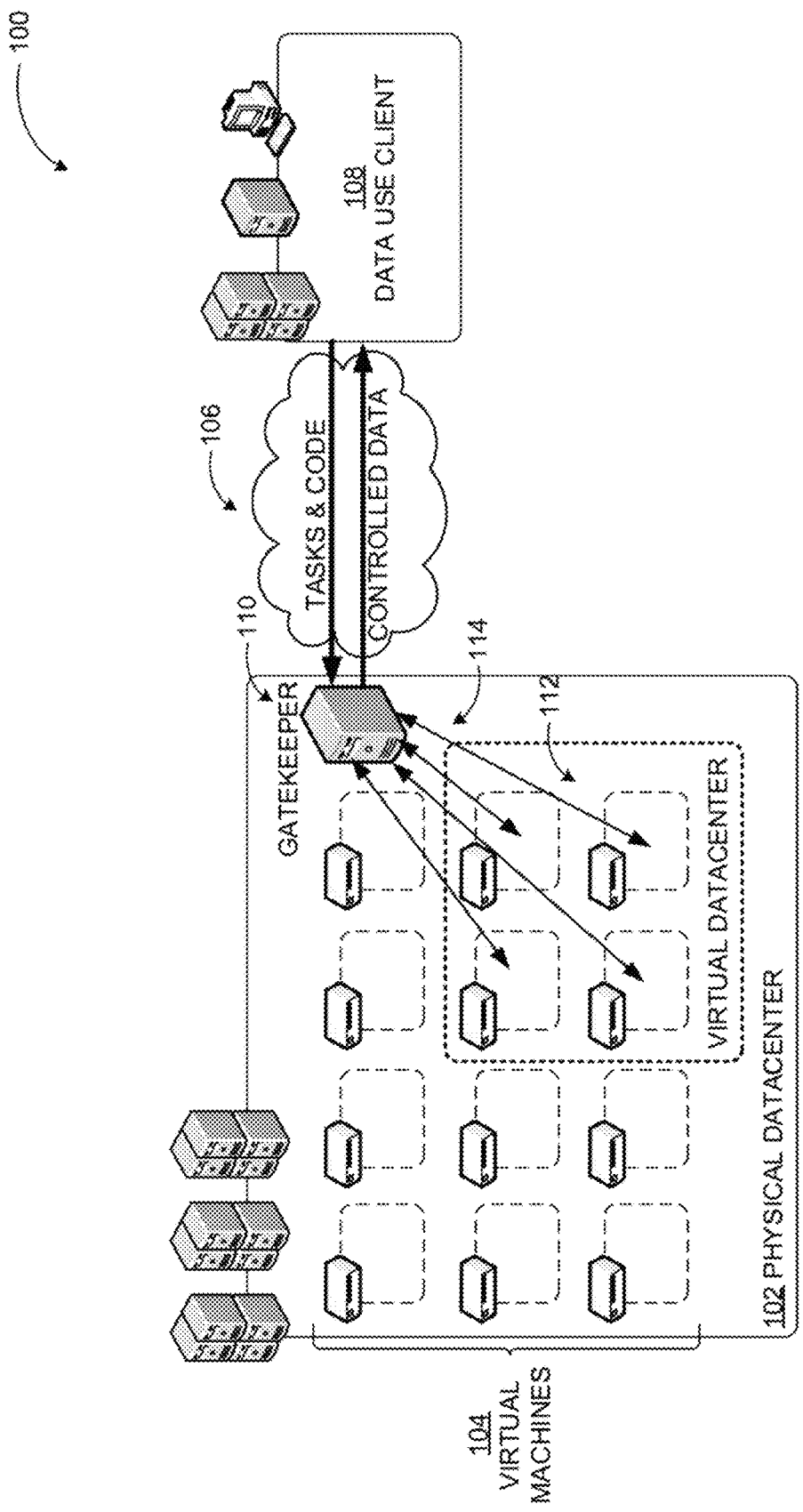
FIG. 1 illustrates an example system, where data analysis tasks may be performed on data maintained by a datacenter by executing, code provided by a data use client.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to allowing clients direct access to perform complex analysis on data assets without compromising those assets by sharing the data contained.

Briefly stated, a system for allowing data use clients direct access to perform complex analysis on data assets without compromising the assets by sharing, the data contained may set up the data assets in virtual datacenters (VDCs) within a physical datacenter and open additional resources within the VDCs to data use clients. The data use clients may be enabled to upload and execute analysis applications with access to valuable data. Data traffic exiting the VDCs through such applications, however, may be controlled by a supervisor that analyses an output and enforces limitations on content and/or volume based on a level of purchased access.

As used herein, the term managed data refers to data collected by an online service provider during the course of their interaction with users or otherwise obtained from various sources. A datacenter managing the collected data may be controlled by the data owner (i.e., the service provider collecting the data) or a third party that manages the data for the data owner. A data use client refers to an entity that makes use of the managed data by analyzing, processing, or marketing the data. A supervisor or gatekeeper may be a computing device, an application, a hosted service, and/or a combination or those that is responsible for controlling data traffic to a data use client from the datacenter. The data traffic may include raw data and/or analysis results, and be in any format.

FIG. 1 illustrates an example system, where data analysis tasks may be performed on data maintained by a datacenter by executing code provided by a data use client, arranged in accordance with at least some embodiments described herein.

A datacenter is a centralized repository for the storage, management, and dissemination of data and information. A private datacenter may exist within an organization's facilities of may be maintained as a specialized facility. Some datacenters may be synonymous with network operations centers (NOCs) containing automated systems that monitor server activity, Web traffic, manage data, and network performance. Other datacenters may be specialized on managing collected data. While datacenters are typically associated with a physical entity (e.g. a server room, a server farm, etc.) datacenters may be configured as Virtual Datacenters (VDCs) as well, where managed data is compartmentalized based on size, owner, or other aspects through virtual servers and data stores.

In conventional datacenters, datacenter administrators or data owners (in some cases, data center administrators and data owners may be the same) program and perform, analysis on managed data providing results to data use clients. The datacenter-centric execution of analysis tasks may involve substantial in terms of programming knowledge, processing capacity, and similar costs. In addition, data use clients may not be comfortable with sharing their analysis strategies with every datacenter administrator or data owner. By switching to a client, programmed approach, large amounts of programming effort may be removed from the datacenter/data owner side, data use clients may be allowed to keep their particular analysis secret, and faster and deeper business intelligence analysis may be enabled raising the value of the data.

Some embodiments employ security properties of VDCs to allow data use clients to upload complex analysis routines while quarantining the output so that only contractually allowed information is returned. Many cloud applications use guaranteed network security. For example, the payments industry employs both plant (physical) and network (virtual) security at a high level. In a VDC agreement the customer may be guaranteed that other users within the physical datacenter cannot access their data. A VDC may be defined as a set of virtual machines (VMs) with a usually customer-furnished IP address range and a service level agreement (SLA) that specifies performance and that the VDC machines can only see each other and that other machines in the datacenter cannot see them at all. The VDC may be expanded and contracted as demand changes.

Referring to FIG. 1, the example architecture presented in a diagram 100 includes a physical datacenter 102, which may be implemented through one or more servers, mainframes, and special purpose devices such as firewalls, routers, etc. A number of VDCs (112) may be deployed within the physical datacenter 102 using virtual machines 104. The owner of managed data may place the managed data inside a VDC 112. A gatekeeper 110, described in more detail below, may accept tasks and code from a data use client 108 such as in the form of loadable client provided instances over one or more networks 106. The data use client provided analysis code may be executed inside the VDC 112 which may be elastically expanded as more data use client jobs arrive. Outgoing results 114 pass through the gatekeeper 110, which may be configured with access to the VDC 112. The gatekeeper 110 may be within or outside of the physical datacenter 102. In addition to enabling execution of the data use client provided code, the gateway 110 may analyze the outgoing results 114 and allow controlled data to be transmitted to the data use client 108. In this fashion, the data owner can allow data use clients to upload entire statistical research suites, run complex long-term cause-effect analysis, or otherwise manage complex searches, the specifics of which do not need to be provided to the data owner. The data owner, meanwhile, may prevent bulk transfers of data and permit contractually allowed outputs (e.g., a chain of valid addresses, each with a single unsigned integer metric associated, or a predefined amount of data from an archive). In some embodiments, the data use client 108 may not have return access to any uploaded data after the data has had contact with the managed data. Restriction on the return access may be enforced by the gatekeeper 110.

During the definition of a VDC, a datacenter customer may specify which VMs have contact with the outside, establishing easily one or a few points of data inspection at which to station the gatekeeper 110. Incoming tasks and code may be allowed to be executed on the managed data ranging from fairly generous to restrictive. If there is a concern about the data use client modifying the managed data within the VDC 112 (e.g., if the datacenter does not provide for read-only access between VMs), then different data use clients may be isolated among multiple VDCs owned by the managed data owner as opposed to a single VDC elasticity shown in the diagram 100. Another approach may include frequent overwriting of the managed data with a known copy from another location, which may be facilitated from a master refresh source if desired.

Once the client code is admitted by the gatekeeper 110, the code may be installed and executed as a regular datacenter job allowing data use clients to use existing software and their analysis method of choice. For example, the data use client may upload an entire statistical package, or may have custom analysis methods based on cloud-specific tools. Alternatively, other customer analysis environments may be designed for use of open source or parallel analysis employing free and scalable software tools.

Output through the gatekeeper 110 may be strictly regulated. While a simple contractual term may allow "X megabytes of output data", a data use client may upload what amounts to a scrape-and-compress tool to steal portions of the raw data. The danger may be minimal if the restricted data is very large in size (allowing a few MB out when the data is PB), The output may instead be restricted to short ASCII, human readable, records plus a few numeric metrics, for example. Alternatively, the data may be limited to such a small output array (e.g., 500 unsigned integers) that threat of theft may be minimized, but a data use client can still extract structural summaries like improved likelihood of action after seeing an advertising impression for a series of categories. The gatekeeper 110 may also allow export by reference, where the client code may export a list of records in the managed data that are the results (e.g. sales prospects) and the gatekeeper 110 may then return the records directly to the data use client.

Figure 2:
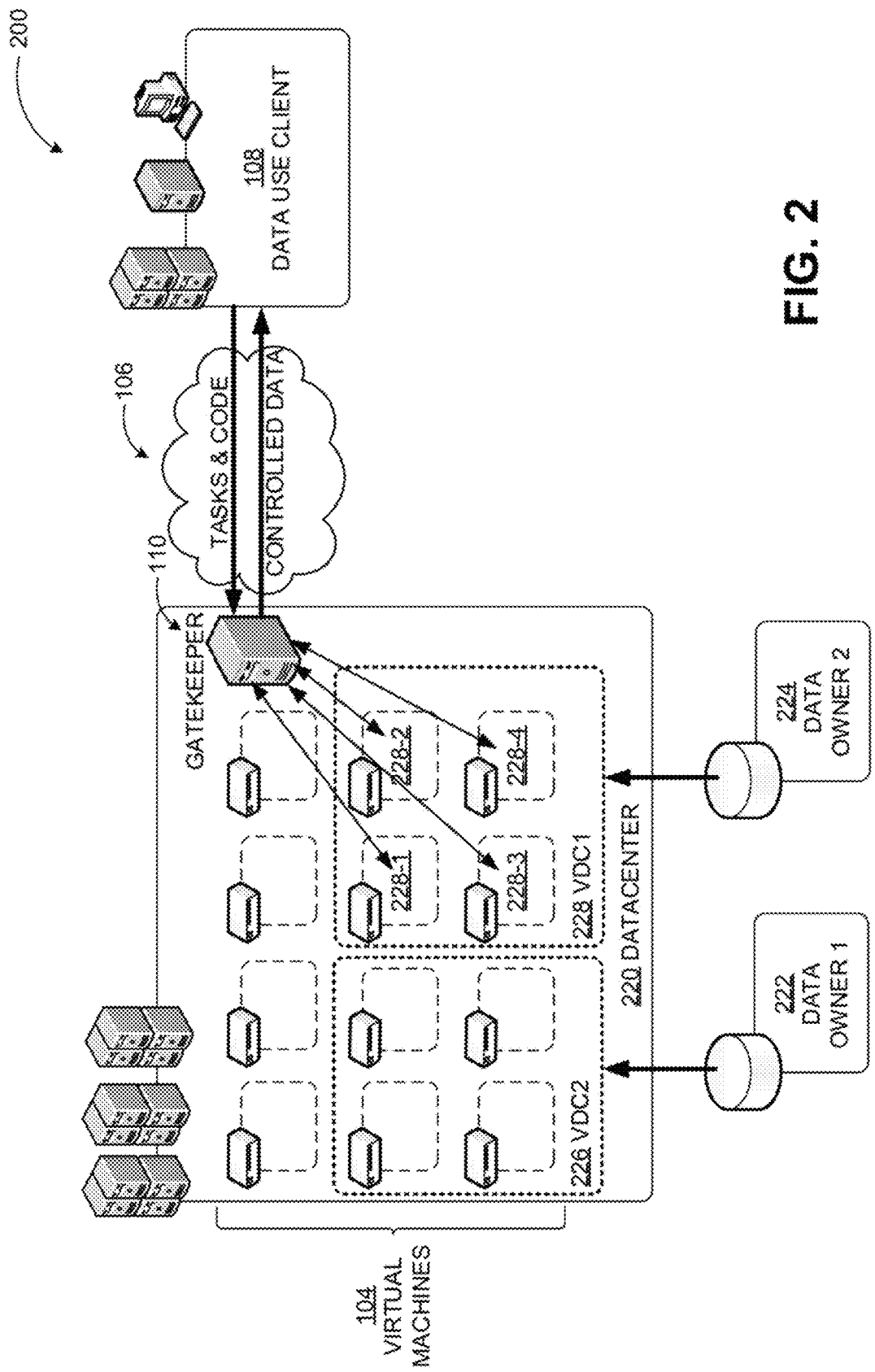
FIG. 2 illustrates an example configuration of the system of FIG. 1, where the analyzed data is owned by entities external to the datacenter.

FIG. 2 illustrates an example configuration of the system of FIG. 1, where the analyzed data is owned by entities external to the datacenter, arranged in accordance with at least some embodiments described herein.

Elements of the example architecture illustrated in a diagram 200 that are similarly numbered in the diagram 100 may have substantially similar functionality. In an example implementation, a datacenter 220 is shown with two VDCs 226 and 228 dedicated to data owners 222 and 224, respectively. While the VDCs may be implemented through single virtual machines, some like the VDC 228 may encompass as multiple number of VMs (228-1 through 228-4).

The data owners 222 and 224 may store their data in the VDCs 22 and 228, and provide an administrator of the datacenter 220 with control rides defining control parameters for outgoing data to the data use client 108. The administrator of the datacenter 220 may then instruct the gatekeeper 110 such that the gatekeeper 110 can enforce size, format, type, timing, and similar limitations on the outgoing data. The configuration described in the diagram 200 may be part of a data loss prevention system implemented by the datacenter (e.g., 220), which provides control functionality to the datacenter management as opposed to the data owners. Some data owners, who may not wish to invest the effort in managing the control of their data may choose this configuration. For data owners that wish to have more control, the configuration described below may be more suitable.

Managing the data use client software after upload may involve additional categories of gatekeeper allowed messaging. For example, system output messages like status and incoming client commands may be allowed. Furthermore, random delays and additional filtering may be imposed to minimize even low-bit rate side channel communications.

Figure 3:
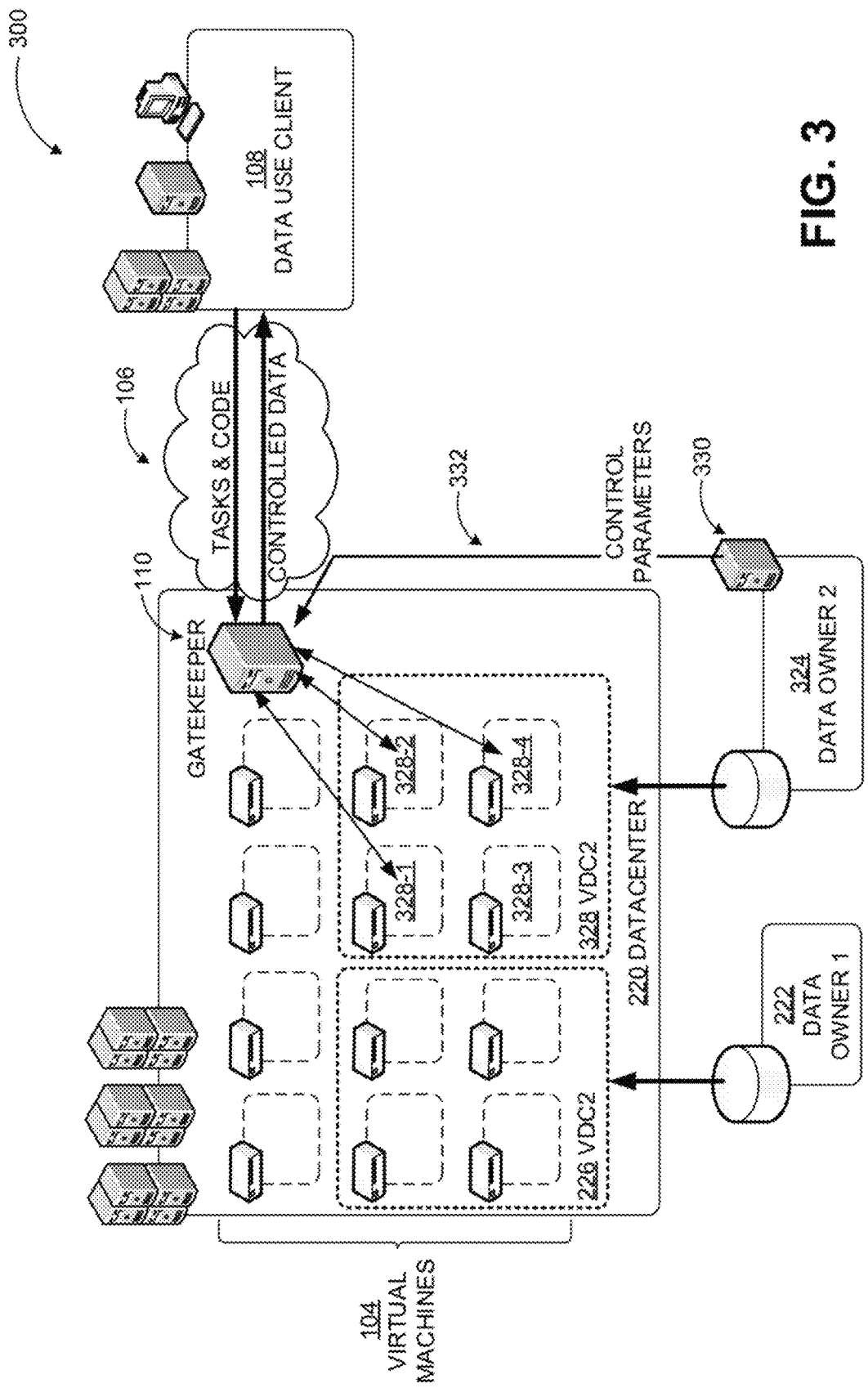
FIG. 3 illustrates another example configuration of the system of FIG. 1, where the analyzed data is owned by entities external to the datacenter and at least some of the control parameters are provided by the data owner(s)

FIG. 3 illustrates another example configuration of the system of FIG. 1, where the analyzed data is owned by entities external to the datacenter and at least some of the control parameters are provided by the data owner(s), arranged in accordance with at least some embodiments described herein.

Elements of the example architecture illustrated in as diagram 300 that are similarly numbered in the diagrams 100 and 200 may have substantially similar functionality. In the example implementation of the diagram 300, the datacenter 220 also includes the multi-VM VDCs 226 and 328 dedicated to data owners 222 and 324, respectively, with the VDC 328 encompassing VMs 328-1 through 328-4.

As discussed above, the data owner 222 may provide its control rules to the gatekeeper 110 via an administrator of the datacenter 220. In practical implementations, implementation of control rules may be accomplished by the data owner specifying custom rules, selecting among default rules offered by the datacenter administrator, or customizing default rules offered by the datacenter administrator. Differently from FIG. 2, the data owner 324 may provide its control parameters 332 through a server 330 directly to the gatekeeper 110. The direct transfer of control parameters from the data owner to the gatekeeper may provide the data owner 324 with the flexibility to change or update control parameters as stored data changes or new data use clients are contracted.

While embodiments have been discussed above using specific examples, components, and configurations in FIGS. 1 through 3, they are intended to provide a general guideline to be used for allowing data use clients direct access to perform complex analysis on data assets without compromising the assets by sharing the data contained in virtual datacenters (VDCs) within a physical datacenter. These examples do not constitute a limitation on the embodiments, which may be implemented using other components, modules, and configurations using the principles described herein. For example, any suitable special purpose or general purpose computing device may be used for as a supervisor or gatekeeper to control exiting data traffic. Furthermore, actions discussed above may be performed in various orders, especially in an interlaced fashion.

Figure 4:
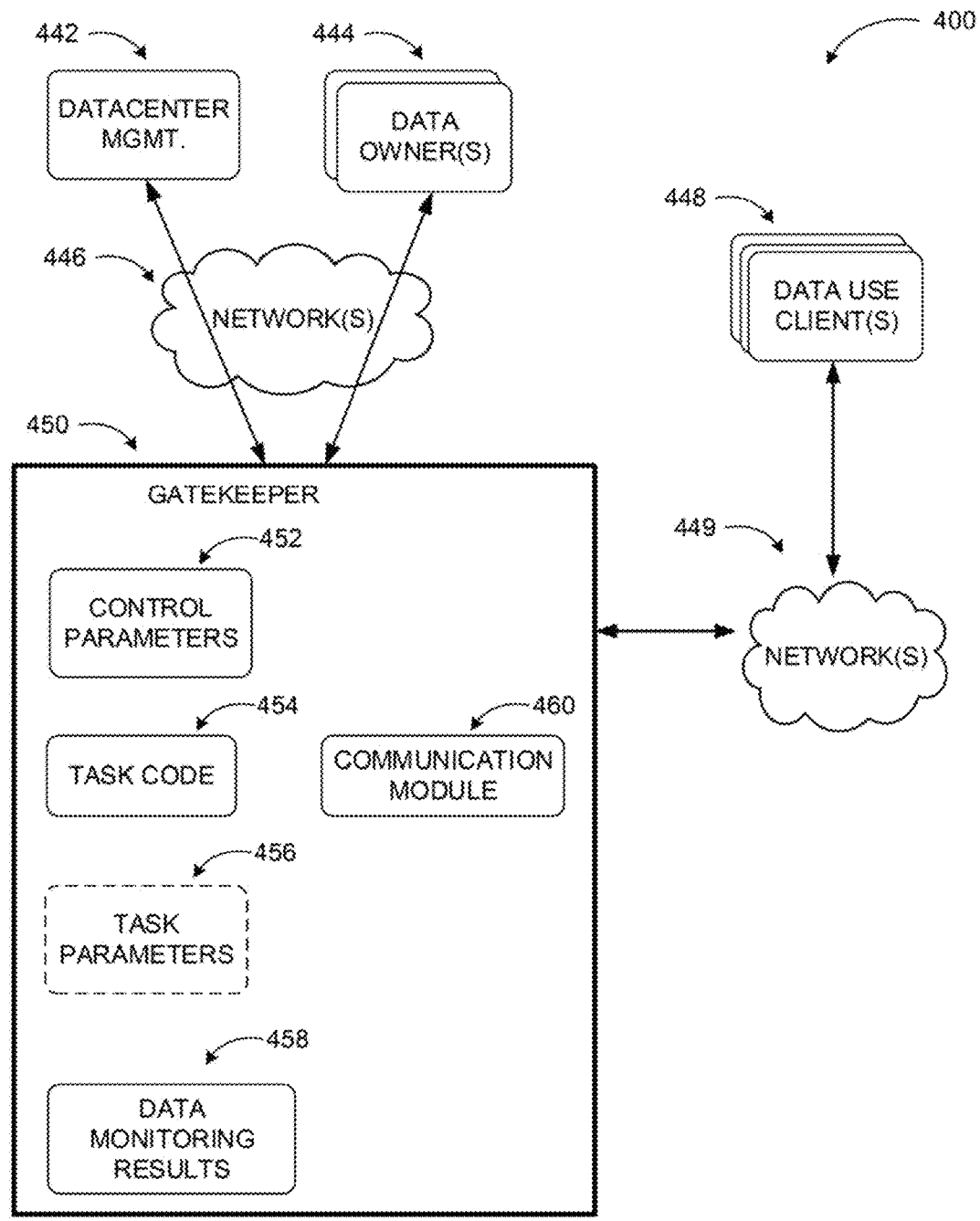
FIG. 4 illustrates a special purpose gatekeeper device for enabling execution of analysis tasks through data use client code and control of result data based on predefined control parameters.

FIG. 4 illustrates a special purpose gatekeeper device for enabling execution of analysis tasks through data use client code and control of result data based on predefined control parameters, arranged in accordance with at least some embodiments described herein.

As discussed previously, data use clients may be enabled to upload and execute analysis applications with access to managed data within one or more VDCs. Data traffic exiting the VDCs through such applications may be controlled by a supervisor or gatekeeper that analyses an output and enforces limitations on content and/or volume. According to some embodiments, the supervisor or gatekeeper may be implemented as a special purpose device like a gatekeeper 450 shown in a diagram 400. The gatekeeper 450 may be configured to communicate with computing devices such as servers representing a datacenter management 442 and data owners 444 over one or more networks 446 receiving one or more control rules associated with access to managed data, accessing the managed data, etc.

The gatekeeper 450 may store in its memory control parameters 452, which may be derived from the one or more control rules. The gatekeeper 450 may also store task code 454, which may be received from one or more data use clients 448 over one or more networks 449 via communication module 460. Task parameters 456 may be derived from the task code or provided separately by the data use clients 44$. Furthermore, data monitoring results 458 may also be stored at the gatekeeper 450 and provided as feedback to the datacenter management 442 or the data owner(s) 444. The gatekeeper 450 may be configured to, receive the task code 454 associated with performing analysis tasks on the managed data from the data use clients 44$, enable the analysis tasks to be performed on the managed data employing the received task code 454, and control delivery of analysis results to the data use clients 448 based on the one or more control parameters 452.

To perform the above-described operations, the gatekeeper 450 may execute one or more applications. The instructions for performing the operations may be hard-coded, dynamically modifiable, or a combination of the two.

Figure 5:
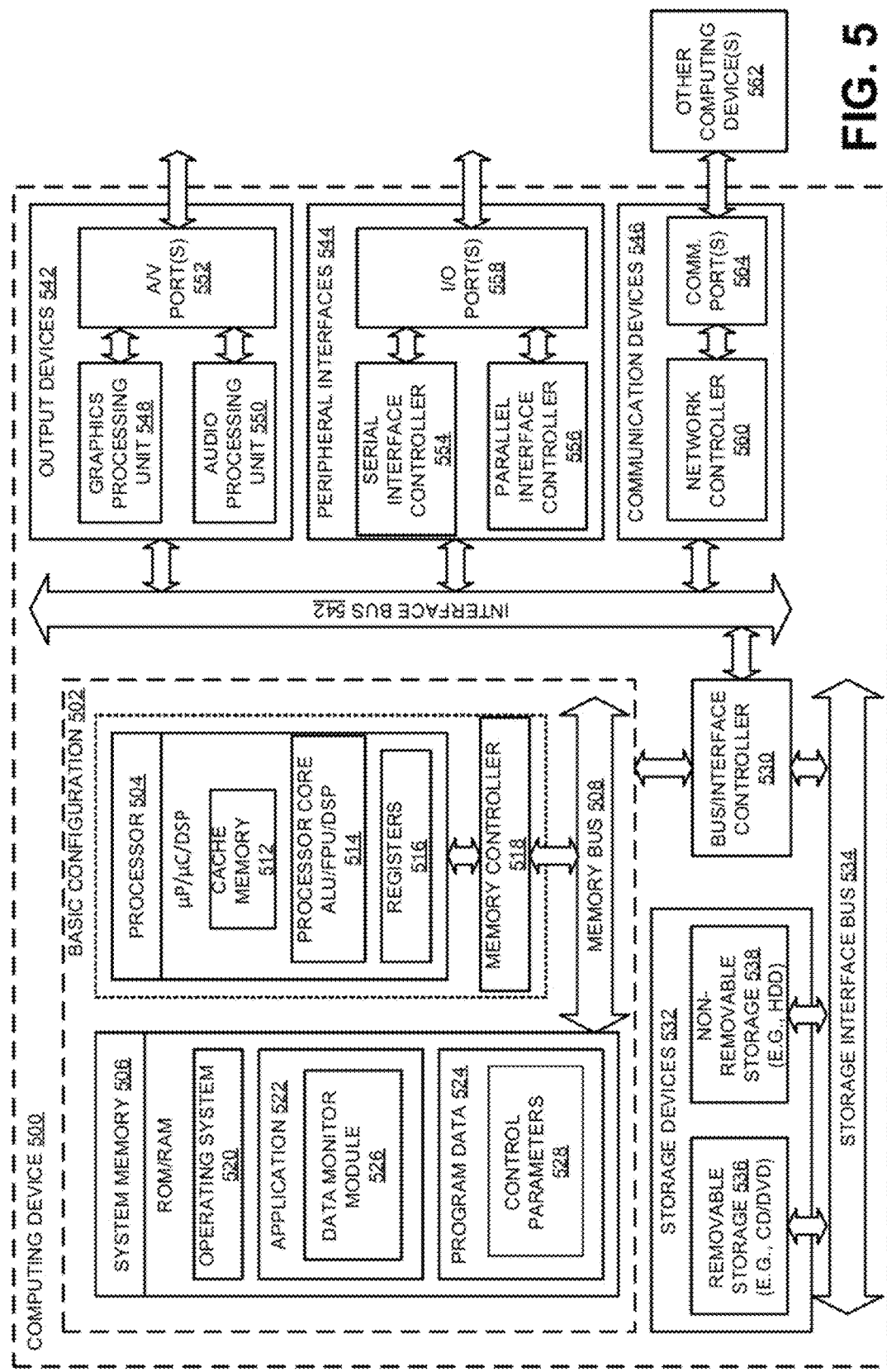
FIG. 5 illustrates a general purpose computing device, which may be used to implement enabling execution of analysis tasks through data use client code and control of result data based on predefined control parameters.

FIG. 5 illustrates a general purpose computing device, which may be used to implement enabling execution of analysis tasks through data use client code and control of result data based on predefined control parameters, arranged in accordance with at least some embodiments described herein. In a very basic configuration 502, a computing device 500 typically includes one or more processors 504 and a system memory 506. A memory bus 508 may be used for communicating between the processor 504 and the system memory 506.

Depending on the desired configuration, the processor 504 may be of any type including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include at operating system 520, one or more applications 522, and program data 524. The applications 522 may include data monitor module 526, which may enable upload and execution of data use client provided, analysis code and delivery of results to the data use client as described herein. The program data 524 may include, among other data, control parameters 528 associated with limiting delivery of analysis results to data use clients. This described the basic configuration 502 is illustrated in FIG. 5 by those components within the inner dashed line.

The computing device 500 may have additional features or functionality, and additional interfaces to facilitate communications between the basic configuration 502 and any required devices and interfaces. For example, as bus/interface controller 530 may be used to facilitate communications between the basic configuration 502 and one or more data storage devices 532 via a storage interface bus 534. The data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., output devices 542, peripheral interfaces 544, and communication devices 546) to the basic configuration 502 via bus/interface controller 530. Some example output devices 542 include a graphics processing unit 548 and an audio processing unit 550, which may be configured to communicate to various external devices such as a display or speakers via one or more A/V ports 552. Example peripheral interlaces 544 include a serial interlace controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more ho ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 6:
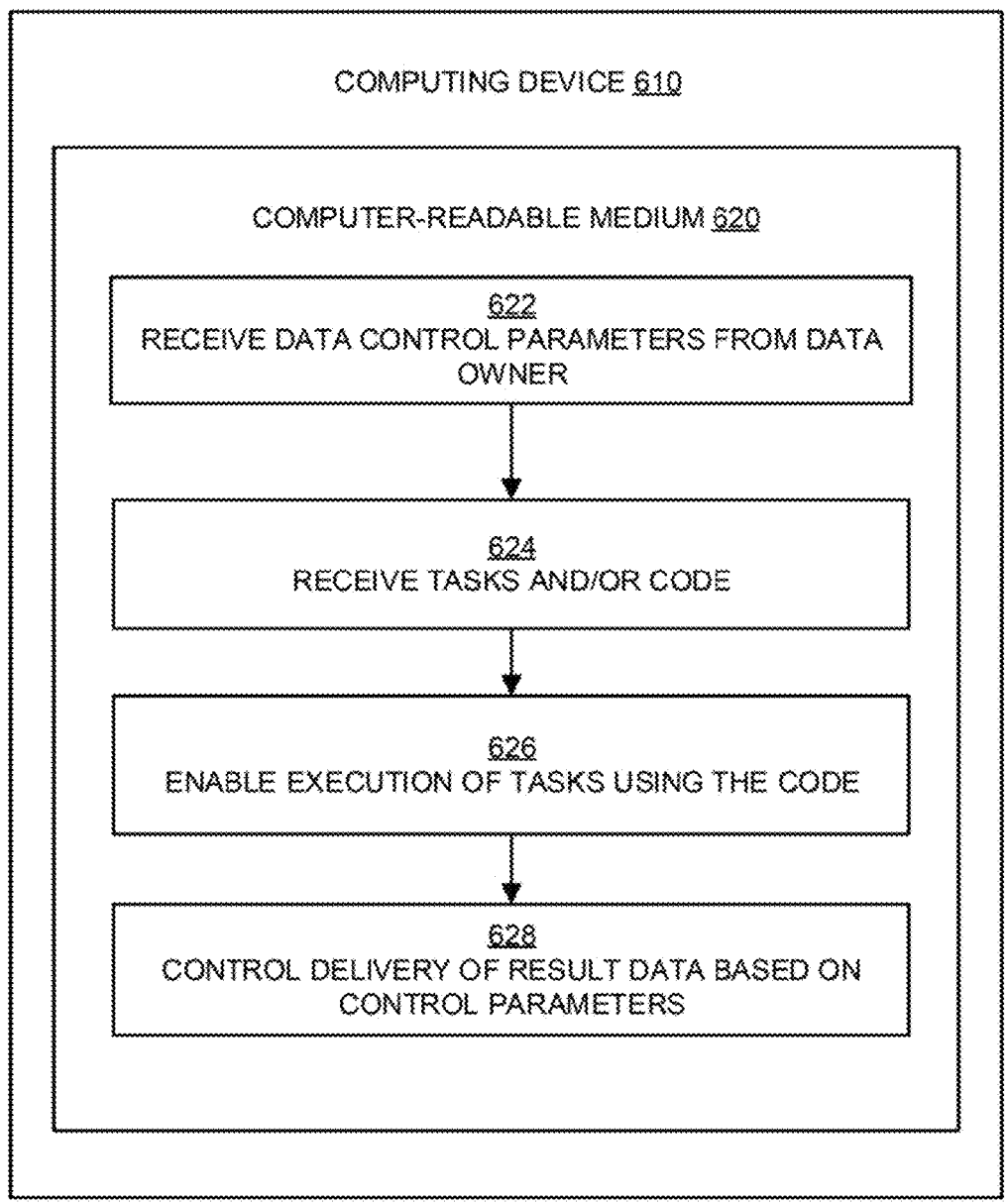
FIG. 6 is a flow diagram illustrating an example method that may be performed by a computing device such as the device in FIG. 5.

FIG. 6 is as flow diagram illustrating an example method that may be performed by a computing device such as the device 500 in FIG. 5, arranged in accordance with at least some embodiments described herein. Example methods may include one or more operations, functions or actions as illustrated by one or more of blocks 622, 624, 626, and/or 628. The operations described in blocks 622 through 628 may also be stored as computer-executable instructions in a computer-readable medium such as a computer-readable medium 620 of a computing device 610.

A process of controlling data traffic to data use client from a datacenter resulting from execution of data use client provided code may begin at block 622, "RECEIVE DATA CONTROL PARAMETERS FROM DATA OWNER". At block 622, a supervisor such as the gatekeeper 450 of FIG. 4 may receive one or more control roles defining the control parameters for limitations on data delivery to a data use client from a data owner and/or datacenter administrators.

Block 622 may be followed by block 624, "RECEIVE TASKS AND/OR CODE." At block 624, tasks to be performed on the managed data stored at one or more VDCs and/or data use client code to perform those tasks may be received by the gatekeeper 450. The gatekeeper 450 may analyze the code to ensure the code meets predefined requirements and/or security rules for the datacenter.

Block 624 may be followed by block 626, "ENABLE EXECUTION OF TASKS USING THE CODE." At block 626, the gatekeeper 450 may enable execution of the data use client code for analysis/sorting of the managed data. The gatekeeper 450 may execute the code itself or the code may be executed by one or more servers of the datacenter, Block 626 may be followed by block 628, "CONTROL DELIVERY OF RESULT DATA BASED ON CONTROL PARAMETERS." At block 628, result data traffic to data use client may be monitored by the gatekeeper 450 and limits enforced based on content, format, amount, timing, etc. The limits may be set based on predefined access levels by the datacenter administrators or the data owner(s).

The functions performed at the blocks in the above described process are for illustration purposes. Execution of datacenter analysis tasks through data use client code may be implemented by similar processes with fewer or additional functions. In some examples, the functions may be performed in a different order. In some other examples, various functions may be eliminated. In still other examples, various functions may be divided into additional functions, or combined together into fewer functions.

Figure 7:
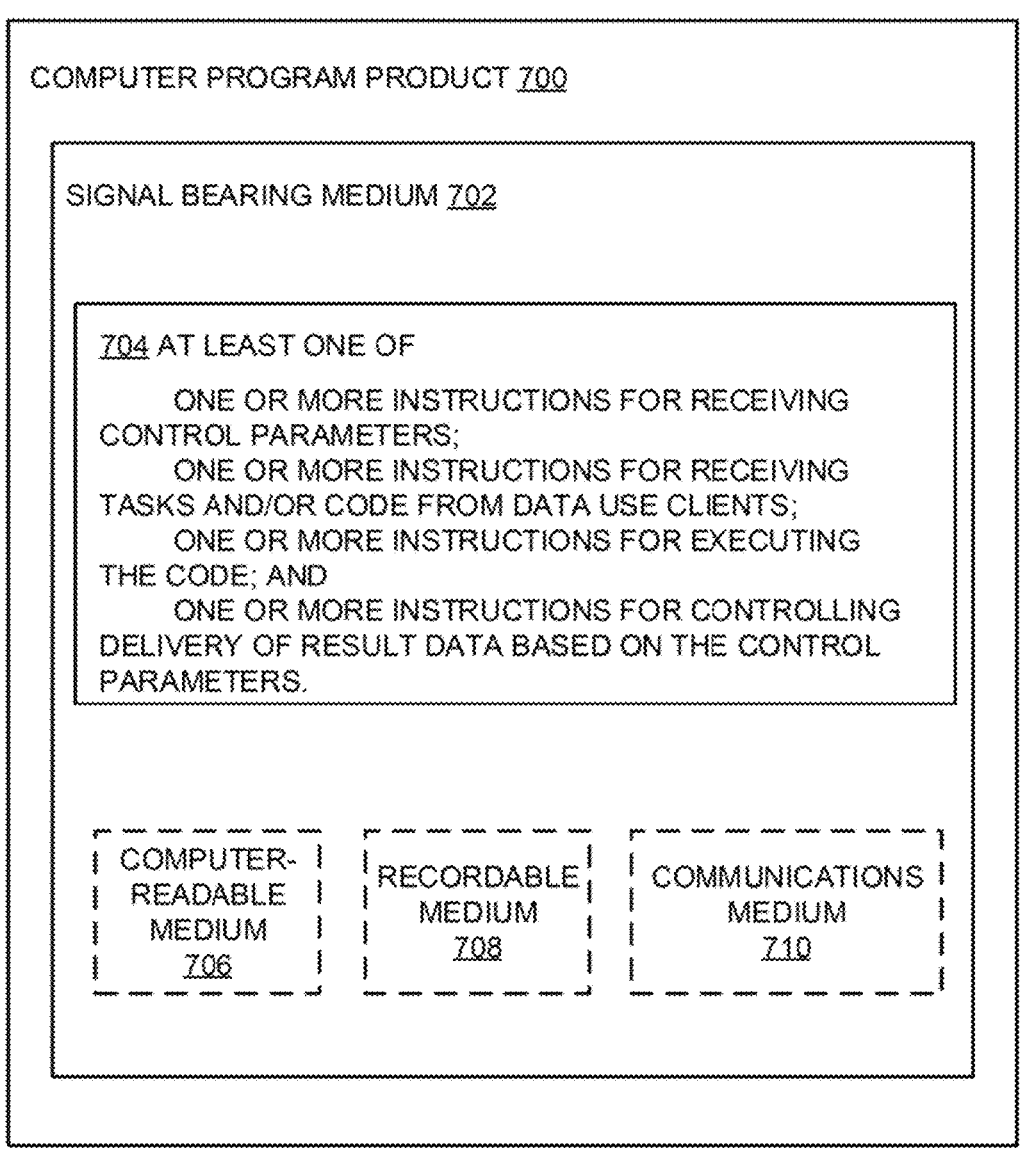
FIG. 7 illustrates a block diagram of an example computer program product, all arranged in accordance with at least some embodiments described herein.

FIG. 7 illustrates a block diagram of an example computer program product, arranged in accordance with at least some embodiments described herein. In some examples, as shown in FIG. 7, the computer program product 700 may include a signal hearing medium 702 that may also include machine readable instructions 704 that, when executed by, for example, a processor, may provide the functionality described above with respect to FIG. 4 and FIG. 5. Thus, for example, referring to the processor 504, the data monitoring, module 526 may undertake one or more of the tasks shown in FIG. 7 in response to the instructions 704 conveyed to the processor 504 by the medium 702 to perform actions associated with controlling data traffic from a datacenter to a data use client as described herein. Some of those instructions may include receiving control parameters, receiving tasks and code from data use clients, executing the code, and controlling delivery of result data based on the control parameters.

In some implementations, the signal bearing medium 702 depicted in FIG. 7 may encompass a computer-readable medium 706, such as, but not limited to, as hard disk drive, a Compact Disc (CD), a Digital Versatile Disk (DVD), a digital tape, memory, etc, in some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., as fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method for controlling analysis of virtual datacenter managed data is provided. The method may include receiving one or more control rules associated with access to managed data, receiving code associated with performing analysis tasks on the managed data from a data use client, enabling the analysis tasks to be performed on the managed data employing the received code, and/or controlling delivery of analysis results to the data use client based on the one or more control rules.

The method may also include controlling the performance of the analysis tasks based on the one or more control rules. The delivery of analysis results may be controlled by a gatekeeper of as datacenter managing the data and the control rules may be received from one of a multiple number of data owners whose data is managed by the datacenter. The method may further include providing a report associated with the delivery of the analysis results to a data owner providing the control rules. The report may include one or more of a summary of the performed analysis tasks, a summary of the analyzed data, or the analyzed data. The control rules may include parameters defined by the data owner for the performance of the analysis tasks and limitations on one or more of an amount of data, a type of data, a format of data, and a timing of delivery to the data use client. The data may be managed through a plurality of extensible virtual datacenters configured within the datacenter managing the data.

The method may further include dynamically expanding the virtual datacenters in response to receiving additional analysis tasks, receiving at least one of custom code and custom parameters to be used in conjunction with existing code for performing analysis tasks at the datacenter, providing a data owner at least one of a status message and an incoming data use client command as the data is analyzed, and/or adding to random delay or an additional filtering process to the delivery of the analysis results.

According to other examples, an apparatus for controlling analysis of virtual datacenter managed data may include a memory configured to store instructions as communication module, and a processing unit configured to execute as data delivery control application in conjunction with the instructions. The data deliver control application may be configured to receive one or more control rules associated with access to managed data, receive code associated with performing analysis tasks on the managed data from a data use client, enable the analysis tasks to be performed on the managed data employing the received code, and/or control delivery of analysis results to the data use client based on the one or more control rules.

The data delivery control application may further be configured to control the performance of the analysis tasks based on the one or more control rules. The control rules may be received from a server of a datacenter managing the data or an owner of the data. The data delivery control application may further be configured to receive from an owner of the data one or more parameters associated with the one or more control rules maintained by the datacenter and/or to provide a report associate (with the delivery of the analysis results to a data owner providing the control rules.

The report may include one or more of a summary of the performed analysis tasks, a summary of the analyzed data, or the analyzed data. The control rules may include parameters defined by the data owner for the performance of the analysis tasks and/or limitations on one or more of an amount of data, a type of data, a format of data, and a timing of delivery to the data use client. The data may be managed through a multiple number of extensible virtual datacenters configured within the datacenter managing the data, and the datacenter may be configured to dynamically expand the virtual datacenters in response to receiving additional analysis tasks. The data delivery control application may further be configured to provide a data owner at least one of a status message and an incoming data use client command as the data is analyzed and/or to add a random delay or an additional filtering process to the delivery of the analysis results.

According to further examples, a computer-readable storage medium may have instructions stored thereon for controlling analysis of virtual datacenter managed data. The instructions n include receiving one more control rules associated with access to managed data receiving code associated with performing anal sis tasks on the managed data from a data use client, enabling, the analysis tasks to be performed on the managed data employing the received code, and/or controlling delivery of analysis results to the data use client based on the one or r more control rules limiting delivered analysis results based on at least one of a content and an amount of the results.

The instructions may further include controlling the performance of the analysis tasks based on the one more control rules. The instructions may be executed by a gatekeeper of a datacenter managing the data and the control rules may be received from cane of multiple number of data owners whose data is managed by the datacenter. The instructions may also include providing a report associated with the delivery of the analysis results to a data owner providing the control rules. The report may include, one or more of a summary of the performed analysis tasks, as summary of the analyzed data, or the analyzed data. The control rules may include parameters defined by the data owner for the performance of the analysis tasks and/or limitations on one or more of an amount of data, a type of data, a format of data, and a timing of delivery to the data use client.

The data may be aged through a multiple number of extensible virtual datacenter configured within the datacenter managing the data, and the instructions may further include dynamically expanding the virtual datacenters in response to receiving additional analysis tasks. The instructions may also include receiving at least one custom code and custom parameters to be used in conjunction with existing code for performing analysis tasks at the datacenter and/or providing a data owner at least one of a status message and an incoming data use client command as the data is analyzed.

There is little distinction left between hardware and software implementations of aspects of systems; the use of hardware or software is generally (hut not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in as variety of forms, and that an illustrative embodiment of the subject matter described herein applies regardless of the particular type of signal bearing medium used to actually carry out the distribution Examples of a signal bearing medium include, but are not limited to, the following: a recordable type medium such as a floppy disk, a hard disk drive, a Compact Disc (CD), a Digital Versatile Disk (DVD), a digital tape, a computer memory, etc., and a transmission type medium such as a digital and/or an analog communication medium (e.g., a fiber optic cable, a waveguide, a wired communications link, a wireless communication link, etc.), Those skilled in the art will recognize that it is common within the art to describe devices and/or processes in the fashion set forth herein, and thereafter use engineering practices to integrate such described devices and/or processes mm data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interlaces, and applications programs, one or more interaction devices, such as a touch pad or screen, and/or control systems including feedback loops and control motors (e.g., feedback for sensing position and/or velocity of gantry systems, control motors for moving and/or adjusting components and/or quantities).

A typical data processing, system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone A, and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustra-

What is claimed is:

1. A method to analyze data, the method comprising:
receiving a first data set from a first data owner;
receiving a second data set from a second data owner;
executing, in a first virtual machine, a first analysis code associated with a first data use client, wherein the first analysis code is configured to:
access the first data set based on a first control parameter associated with the first data set; and
access the second data set based on a second control parameter associated with the second data set;
executing, in a second virtual machine, a second analysis code associated with a second data use client, wherein the second analysis code is configured to:
access the first data set based on a third control parameter associated with the first data set; and
access the second data set based on a fourth control parameter associated with the second data set;
generating a first analysis result based on the execution of the first analysis code;
generating a second analysis result based on the execution of the second analysis code; and
delivering the first analysis result to the first data use client and the second analysis result to the second data use client based on one or more of an amount of data, a type of the data, and a format of the data in the first analysis result and the second analysis result, wherein the delivering comprises allowing data that comprises short ASCII data, human readable records, or numeric data that meet a predetermined threshold for output array size and disallowing other data.

2. The method of claim 1, further comprising:
applying, by use of the first control parameter, a first limitation on an access to a portion of the first data set; and
accessing, based on the first limitation, the portion of the first data set through use of the first analysis code.

3. The method of claim 2, wherein the first limitation includes one or more of an access limitation to an amount of data in the first data set, a limitation to a type of the data in the first data set, a format limitation of the first data set, a content limitation of the first data set, and a timing limitation to access the first data set.

4. The method of claim 1, further comprising:
applying, by use of the second control parameter, a second limitation on an access to a portion of the second data set; and
accessing, based on the second limitation, the portion of the second data set through use of the second analysis code.

5. The method of claim 1, further comprising:
applying, by use of the third control parameter, a third limitation on an access to a portion of the first data set; and
accessing, based on the third limitation, the portion of the first data set through use of the first analysis code.

6. The method of claim 1, further comprising:
applying, by use of the fourth control parameter, a fourth limitation on an access to a portion of the second data set; and
accessing, based on the fourth limitation, the portion of the second data set through use of the second analysis code.

7. The method of claim 1, further comprising:
applying, by use of the first control parameter, a first limitation on an access to a portion of the first analysis result by the first data use client;
applying, by use of the second control parameter, a second limitation on the access to the portion of the first analysis result by the first data use client; and
allowing the first data use client to access the portion of the first analysis result based on the first control parameter and the second control parameter.

8. The method of claim 7, further comprising:
allowing the first data owner to access a first report associated with a portion of the first analysis result,
wherein the first report is associated with the access to the portion of the first analysis result by the first data use client, and
wherein the first report includes one or more of a summary of a first analysis task, a summary of the first data set, and an analyzed first data set.

9. The method of claim 1, further comprising:
applying, by use of the third control parameter, a third limitation on an access to a portion of the second analysis result by the second data use client;
applying, by use of the fourth control parameter, a fourth limitation on the access to the portion of the second analysis result by the second data use client; and
allowing the second data use client to access the second analysis result based on the third control parameter and the fourth control parameter.

10. The method of claim 9, further comprising:
allowing the second data owner to access a second report associated with the portion of the second analysis result,
wherein the second report is associated with the access to the portion of the second analysis result by the second data use client, and
wherein the second report includes one or more of a summary of a second analysis task, a summary of the second data set, and an analyzed second data set.

11. The method of claim 1, wherein the first control parameter is based on a level of access purchased by the first data use client, and wherein the level of access includes an access to the first data set by the first analysis code.

12. A computer-readable storage device having instructions stored thereon to analyze data, the instructions comprising:
receiving a first data set from a first data owner;
receiving a second data set from a second data owner;
executing, in a first virtual machine, a first analysis code associated with a first data use client, wherein the first analysis code is configured to:
access the first data set based on a first control parameter associated with the first data set; and
access the second data based on a second control parameter associated with the second data;
executing, in a second virtual machine, a second analysis code associated with a second data use client, wherein the second analysis code is configured to:
access the first data set based on a third control parameter associated with the first data set; and
access the second data based on a fourth control parameter associated with the second data;
generating a first analysis result based on the execution of the first analysis code;
generating a second analysis result based on the execution of the second analysis code; and delivering the first analysis result to the first data use client and the second analysis result to the second data use client based on one or more of an amount of data, a type of the data, and a format of the data in the first analysis result and the second analysis result, wherein the delivering comprises allowing data that comprises short ASCII data, human readable records, or numeric data that meet a predetermined threshold for output array size and disallowing other data.

13. The computer-readable storage device of claim 12, wherein the instructions further comprise:

applying, by use of the first control parameter, a first limitation on an access to a portion of the first data set, wherein the first limitation includes one or more of an access limitation to an amount of data in the first data set, a limitation to a type of the data in the first data set, a format limitation of the first data set, a content limitation of the first data set, and a timing limitation to access the first data set; and accessing the portion of the first data set through use of the first analysis code.

14. The computer-readable storage device of claim 12, wherein the instructions further comprise:

receiving a first set of control rules from the first data owner, wherein the first set of control rules include parameters defined by the first data owner for a performance of a first analysis task, parameters to access the first data set, and restrictions to prohibit an access to the first data set;

performing the first analysis task on the first data set based on the first analysis code and the first set of control rules;

detecting a completion of the first analysis task; and providing the first data owner one or more of a status message and an incoming data use client command.

15. The method of claim 1, further comprising:

prior to the delivering of the first analysis results to the first data use client, adding at least one of:

a delay or an additional filtering process to the delivering of the first analysis results to the first data use client; and providing at least one of a status message or an incoming data use client command to the first data owner.

* * * * *